United States Patent [19]

Nohmi et al.

[11] Patent Number: 4,724,367
[45] Date of Patent: Feb. 9, 1988

[54] SYSTEM FOR DRIVING A MOTOR

[75] Inventors: Makoto Nohmi; Shoji Miyamoto, both of Kawasaki, Japan

[73] Assignee: Hitachi, Ltd., Tokyo, Japan

[21] Appl. No.: 826,346

[22] Filed: Feb. 5, 1986

[30] Foreign Application Priority Data

Mar. 4, 1985 [JP] Japan ................. 60-41114

[51] Int. Cl.⁴ ............................................. H02P 5/16
[52] U.S. Cl. ................................ 318/338; 318/245; 318/345 R
[58] Field of Search ............. 318/246, 247, 248, 249, 318/139, 345 G, 345 H, 345 C, 345 D, 338, 245, 341

[56] References Cited

U.S. PATENT DOCUMENTS

| | | | |
|---|---|---|---|
| 2,298,735 | 10/1942 | Gray | 318/245 |
| 2,799,818 | 7/1957 | Brown | 318/245 |
| 3,302,088 | 1/1967 | Wigington | 318/246 |
| 3,305,716 | 2/1967 | Wigington | 318/246 |
| 3,466,522 | 9/1969 | Cushing, Jr. | 318/338 X |
| 3,524,120 | 8/1970 | Brown | 318/249 |
| 3,562,618 | 2/1971 | Tsergas | 318/246 |
| 3,906,317 | 9/1975 | Narita | 318/246 |
| 3,980,936 | 9/1976 | Wright | 318/246 |
| 4,334,177 | 6/1982 | Lund | 318/345 G |

Primary Examiner—Benjamin Dobeck
Attorney, Agent, or Firm—Antonelli, Terry & Wands

[57] ABSTRACT

A system for driving a motor, comprising a DC power supply source, a chopper apparatus switching voltage of the DC source to convert it into predetermined voltage and a shunt DC motor, wherein an armature and a field winding are connected in series and both ends of the series circuit are connected to the positive and negative terminals of the DC source and at the same time voltage at the junction point between the armature and the field is controlled by the chopper apparatus, is provided.

3 Claims, 4 Drawing Figures

SYSTEM FOR DRIVING A MOTOR

BACKGROUND OF THE INVENTION

1. Field of the Invention

The present invention relates to a system for driving a motor, and more particularly relates to a system for driving a motor by employing chopper control.

2. Description of the Prior Art

There are three types of DC motors, i.e., a series motor, a shunt motor and a compound motor. Up to the present, a series motor has been mainly used for applications such as electric trains, where the speed control is necessary, because of the ease of control and the cost and volume of the chopper apparatus. However, as the magnetic fields of a series motor must be switched in accordance with the rotational speed range of the motor, the structure of the motor is complicated and problems such as limitation of the torque in the high speed range and the difficulty of the regenerative control are unavoidable. Therefore, the type of the motor for such application has been gradually switched over to a shunt motor or a compound motor recently. However, in the case of a shunt motor, the ratio of the current fluctuation against the voltage fluctuation is relatively large so that it is a problem how the influence of the voltage fluctuation can be suppressed.

SUMMARY OF THE INVENTION

It is an object of the present invention to provide a system for driving a shunt motor wherein the influence of the fluctuation of the source voltage is suppressed.

It is another object of the present invention to provide a system for driving a shunt motor wherein the torque is not reduced even in the high speed range.

It is still another object of the present invention to provide an improved system for driving a shunt motor wherein advantages of both a series motor and a shunt motor are maintained and utilized.

In order to realize the objects mentioned above, a system for driving a shunt motor of the present invention comprises:

a DC source;

a shunt winding DC motor in which an armature and a field winding are connected in series and both ends of that series circuit are connected to the DC source; and a chopper apparatus which switches the voltage of the DC source to convert it into the predetermined voltage, wherein the rotational speed of the motor is controlled by the output voltage of the chopper apparatus which is applied to both terminals of the armature.

By the system for driving of the present invention, as the armature and the field winding are connected in series, when the voltage between the two terminals of the armature is changed by the chopper apparatus, the field intensity changes in proportion to the difference between the source voltage and the armature voltage. Therefore, if the rate of revolution of the motor is increased and the armature voltage is increased, the field is automatically suppressed.

In other words, without employing an apparatus exclusively for the field regulation, the field can be automatically regulated in accordance with the rate of revolution of the motor.

The foregoing and other objects, advantages, manner of operations and novel features of the present invention will be understood from the following detailed description read in connection with the accompanying drawings.

DESCRIPTION OF THE PREFERRED EMBODIMENTS

Figure 1:
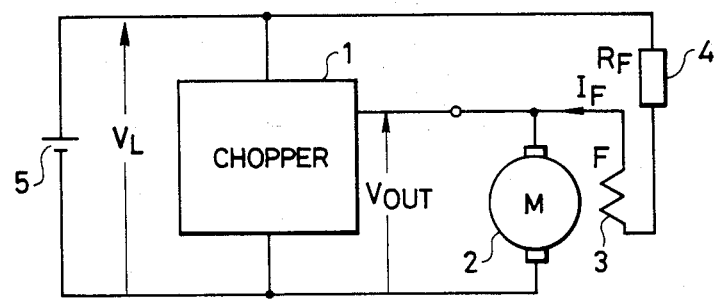
FIG. 1 is a circuit diagram showing one embodiment of a system for driving a shunt motor of the present invention.

FIG. 1 shows one embodiment of a system for driving a motor and the reference numeral 1 denotes a chopper apparatus; 2, an armature of the motor; 3, a field winding; 4, a resistor of resistance $R_F$ for field current regulation; and 5, a DC source. The armature 2 and the field winding 3 are connected in series and the DC voltage $V_L$ of the source 5 is applied to both ends of that series circuit. The potential between the armature 2 and the field winding 3 can be variably controlled by the output voltage $V_{out}$ of the chopper apparatus 1.

Figure 2:
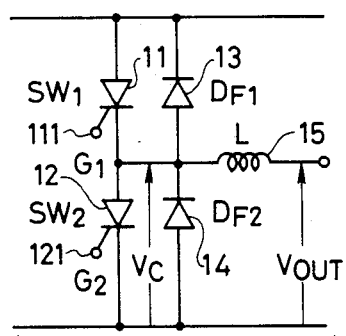
FIG. 2 is a circuit diagram showing a main portion of the chopper apparatus 1 given in FIG. 1.

FIG. 2 shows one embodiment of the circuit configuration of a main portion of the chopper apparatus 1. In FIG. 2, the reference numerals 11 and 12 denote thyristors which are ignited and turned off by the voltages applied to the respective gates 111 and 121; 13 and 14, diodes; and 15, a smoothing reactor. From this apparatus, the output voltage $V_{out}$, whose magnitude is controlled, can be obtained at the terminal of the smoothing reactor 15 by the ON-OFF operation of the thyristors 11 and 12 in accordance with the timing of pulses applied to the respective gates 111 and 121. The voltage $V_{out}$ is applied to both terminals of the armature 2 and, by controlling the voltage $V_{out}$ the current is made to flow from the source 5 to the motor or from the motor to the source 5 so that the motor can be accelerated or decelerated.

The output voltage $V_{out}$ of the chopper apparatus 1 is equal to the average of the voltage $V_c$ generated by the switching of the thyristors.

Figure 3:
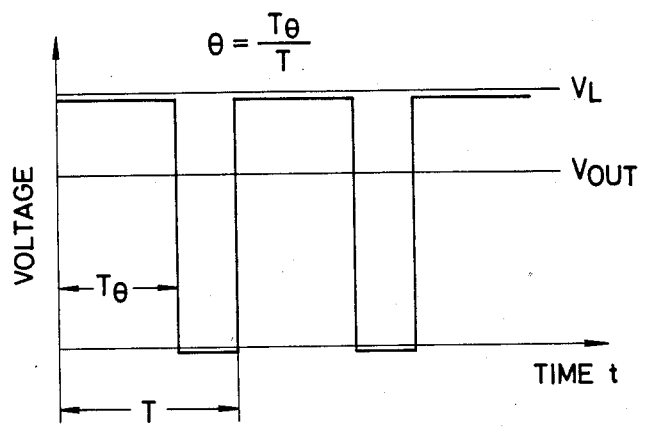
FIG. 3 is a waveform curve describing the output voltage $V_{out}$ of the chopper apparatus 1.

FIG. 3 shows a relation between a switching period T and an output voltage $V_{out}$ of a thyristor. $\theta$ is a ratio between the switching period T and the time $T_\theta$ during which the output voltage $V_c$ of the thyristor stays at the source voltage $V_L$. If the voltage drop in the thyristor and the diode themselves can be neglected for the sake of simplicity, $V_{out}$ is expressed by the following formula:

$$V_{out} = \theta \cdot V_L < V_L \tag{1}$$

Generally speaking, in an actual chopper apparatus, a current $I_M$ applied to a motor is controlled to be constant by feeding the motor current $I_M$ back to a gate control part. Although in the embodiment shown in FIG. 2 two pairs of thyristors and diodes are employed, as two pairs are not operated simultaneously for acceleration and deceleration, circuit operations equivalent to the ones as shown in FIG. 2 may be obtained by employing only one pair of a thyristor and a diode, and a switching circuit. These circuit configurations themselves in the chopper apparatus are not essential in the present invention.

In the present invention, when the motor is driven at a revolution rate N, provided that there is no saturation of the field, the induced voltage $V_M$ of the armature 2 is proportional to the products of the field current $I_F$ and the revolution rate N and is expressed by the following formula:

$$V_M = K \cdot I_F \cdot N \quad (2)$$

wherein K is a constant.

On an assumption that the internal resistance of the armature is small enough and hence the voltage drop due to the internal resistance is small enough compared to the source voltage $V_L$, the field current $I_F$ is proportional to the difference between the source voltage $V_L$ and the armature voltage $V_M$ and:

$$I_F = \frac{V_L - V_M}{R_F} \quad (3)$$

Therefore, from the formulae (2) and (3), the armature voltage $V_M$ is:

$$V_M = \frac{V_L}{\frac{R_F}{K \cdot N} + 1} \quad (4)$$

Therefore, as the number of rotation N of the motor conforms to:

$$0 \leq N < \infty,$$

then always $V_M < V_L$.

It means that the armature voltage $V_M$ can be controlled by the output voltage $V_{out}$ of the chopper apparatus given by the formula (1).

The armature current $I_M$ can be freely controlled by changing the chopper output voltage $V_{out}$ and, in such a case, the field current $I_F$ can be made different from $I_M$.

In the application of a series motor, the dependency of the maximum current upon rate of revolution, i.e., the dependency of the maximum output torque upon the rate of revolution, has hitherto been a problem because the currents $I_F$ and $I_M$ have changed with an identical value. The problem, however, is solved in the system for driving a shunt motor of the present invention.

It is understood from the apparatus configuration given in FIG. 1 that, by the system for driving a motor of the present invention, the field can be regulated without employing a chopper for field control which is necessary in conventional methods for driving a field control type shunt motor.

Figure 4:
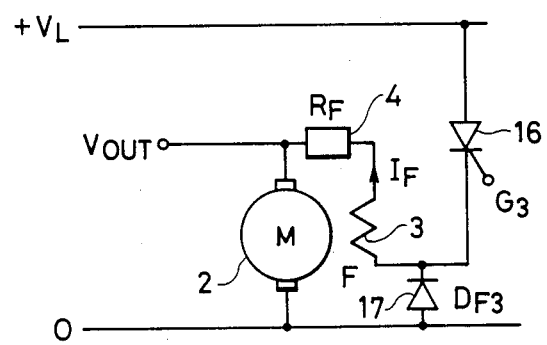
FIG. 4 is a circuit diagram showing another embodiment of a system for driving a shunt motor of the present invention.

However, it is to be noted that, even in the present invention, a means for field control can be jointly employed just like in the case of the conventional field control type. One embodiment of such application is shown in FIG. 4. A DC voltage $V_L$ is applied to a series circuit of a thyristor 16 and a diode 17, and a field winding 3 is connected to a junction point between the two elements 16 and 17, and a field current $I_F$ can be predetermined by the thyristor 16 independently of the armature. By this system, if circuit parameters are so selected as to make the time constant of the main circuit and the time constant of the field circuit identical, the fluctuation of the field current caused by the fluctuation of the source voltage can be reduced and hence more stable control system can be constituted.

What is claimed is:

1. A system for driving a motor, comprising:
   a DC source for producing a constant DC voltage;
   a DC motor having one end of an armature connected to one end of a field circuit at a junction point, said field circuit including a field winding and resistor means connected in series to said field winding for regulating the field current, said armature and said field circuit having the other ends thereof connected respectively to the ends of said DC source and forming a current path through which the field current continuously flows into or from said armature when said DC motor is driven; and
   means for controlling the voltage of said junction point between said armature and said field circuit thereby enabling control of the current flowing through said armature independently of the field current.

2. A system for driving a motor as claimed in claim 1, further comprising means for controlling current applied to said field winding.

3. A system for driving a motor according to claim 1, wherein said control means comprises:
   a chopper apparatus connected to said DC source for producing a controlled output voltage by switching the DC voltage applied thereto from said DC source; and
   means for supplying said controlled output voltage to said junction point.

* * * * *